(12) United States Patent
Nomizo

(10) Patent No.: US 9,334,000 B2
(45) Date of Patent: May 10, 2016

(54) RUBBER TRACK

(75) Inventor: Juichi Nomizo, Yokohama (JP)

(73) Assignee: BRIDGESTONE CORPORATION, Tokyo (JP)

( * ) Notice: Subject to any disclaimer, the term of this patent is extended or adjusted under 35 U.S.C. 154(b) by 298 days.

(21) Appl. No.: 13/989,008

(22) PCT Filed: Nov. 24, 2011

(86) PCT No.: PCT/JP2011/077024
§ 371 (c)(1),
(2), (4) Date: May 22, 2013

(87) PCT Pub. No.: WO2012/070609
PCT Pub. Date: May 31, 2012

(65) Prior Publication Data
US 2013/0241278 A1    Sep. 19, 2013

(30) Foreign Application Priority Data
Nov. 25, 2010   (JP) .................................. 2010-262579

(51) Int. Cl.
*B62D 55/24*   (2006.01)
*B62D 55/26*   (2006.01)

(52) U.S. Cl.
CPC .............. *B62D 55/24* (2013.01); *B62D 55/244* (2013.01); *B62D 55/26* (2013.01)

(58) Field of Classification Search
CPC ....... B62D 55/24; B62D 55/26; B62D 55/244
USPC .......................... 305/178, 170, 179, 165, 166
See application file for complete search history.

(56) References Cited

U.S. PATENT DOCUMENTS 5,380,076 A *  1/1995  Hori ............................... 305/171
6,290,009 B1   9/2001  Kondo et al.

(Continued)

FOREIGN PATENT DOCUMENTS

CN    1330009 A      1/2002
JP    S58-124379 U   8/1983
(Continued)

OTHER PUBLICATIONS

Extended European Search Report, dated Apr. 7, 2014, issued in European Patent Application No. 11843624.5.
(Continued)

*Primary Examiner* — S. Joseph Morano
*Assistant Examiner* — Jean Charleston
(74) *Attorney, Agent, or Firm* — Sughrue Mion, PLLC

(57) ABSTRACT

Provided is a rubber track (10) including a track main body (11) formed of a rubber material in an endless belt shape, in which a plurality of lug sections (14, 15) protrude from an outer circumferential surface (11*b*) of the track main body (11) in a track circumferential direction (A) at an interval, engaging sections (17) engaged with a vehicle wheel of a track-type vehicle are disposed at a portion (16) of the track main body (11) disposed between the lug sections (14, 15) neighboring in the track circumferential direction (A), and through-groove sections (24, 25) passing through the lug sections (14, 15) in the track circumferential direction (A) are formed in the lug sections (14, 15), wherein areas of ground surfaces (26) constituted by top surfaces (14*a*, 15*a*) of the plurality of lug sections (14, 15) are different from each other at both sides in a track widthwise direction (B) with respect to an imaginary line (L) which extends in the track circumferential direction (A) throughout the entire circumference and passes over the plurality of engaging sections (17).

4 Claims, 4 Drawing Sheets

(56) References Cited

U.S. PATENT DOCUMENTS

| | | | |
|---|---|---|---|
| 2003/0209942 A1* | 11/2003 | Deland et al. | 305/178 |
| 2009/0079260 A1* | 3/2009 | Song | 305/170 |
| 2010/0013298 A1* | 1/2010 | Sugihara | 305/195 |

FOREIGN PATENT DOCUMENTS

| | | |
|---|---|---|
| JP | 06-293281 A | 10/1994 |
| JP | 10100955 A | 4/1998 |
| JP | 11-020755 A | 1/1999 |
| JP | 2001-322574 A | 11/2001 |
| JP | 2004268781 A | 9/2004 |
| JP | 2005236160 A | 9/2005 |
| JP | 2005263160 A | 9/2005 |
| JP | 2005-335551 A | 12/2005 |
| JP | 4188494 B2 | 11/2008 |
| WO | 2010/122929 A1 | 10/2010 |

OTHER PUBLICATIONS

Communication dated Jan. 27, 2015 from the Japanese Patent Office in counterpart application No. 2012545782.

Communication dated Feb. 27, 2015 from the State Intellectual Property Office of the People's Republic of China in counterpart application No. 201180065882.4.

International Search Report for PCT/JP2011/077024, dated Jan. 10, 2012.

* cited by examiner

RUBBER TRACK

BACKGROUND OF THE INVENTION

1. Field of the Invention

The present invention relates to a rubber track mounted on a construction machine such as a hydraulic excavator or the like, a farm machine, or another track-type vehicle.

Priority is claimed on Japanese Patent Application No. 2010-262579, filed Nov. 25, 2010, the content of which is incorporated herein by reference.

2. Description of Related Art

In the related art, for example, as disclosed in the following Patent Literature 1, a configuration having a track main body formed of a rubber material in an endless belt shape is known as a rubber track. A plurality of pairs of lug sections disposed in a track widthwise direction at an interval protrude from an outer circumferential surface of the track main body in a track circumferential direction at an interval. In the track main body, engaging holes engaged with driving wheels of a track-type vehicle are disposed at positions between the pairs of lug sections neighboring in the track circumferential direction. These engaging holes are disposed on an imaginary line extending in the track circumferential direction throughout the entire circumference.

Patent Documents

[Patent Literature 1] Japanese Patent Registration No. 4188494

DISCLOSURE OF INVENTION

Problems to be Solved by the Invention

A vehicle frame of the track-type vehicle is bent by its own weight. Accordingly, in a state in which the rubber track is attached to the driving wheel, a large load is applied to a portion of the rubber track closer to the inside of the track-type vehicle than the imaginary line. That is, in the rubber track of the related art, the portion disposed in the inside is likely to be damaged more than a portion disposed at the outside. As a result, a lifespan of the rubber track may be reduced.

In consideration of the above-mentioned circumstances, an object of the present invention is to provide a rubber track capable of increasing a lifespan thereof.

Means to Solve the Problems

In order to achieve the aforementioned object, the present invention provides the following configurations.

A rubber track according to the present invention includes a track main body formed of a rubber material in an endless belt shape, in which a plurality of lug sections protrude from an outer circumferential surface of the track main body in a track circumferential direction at an interval, engaging sections engaged with a vehicle wheel of a track-type vehicle are disposed at a portion of the track main body disposed between the lug sections neighboring in the track circumferential direction, and a through-groove section passing through the lug section in the track circumferential direction is formed in the lug section, wherein areas of ground surfaces formed by top surfaces of the plurality of lug sections are different from each other at both sides in a track widthwise direction with respect to an imaginary line which extends in the track circumferential direction throughout the entire circumference and passes over the plurality of engaging sections.

According to the configuration, the areas of the ground surfaces are different from each other at both sides in the track widthwise direction with respect to the imaginary line. When the areas of the ground surfaces disposed at one side in the track widthwise direction from the imaginary line are larger than that disposed at the other side, in a state in which the one side is directed toward the inside of the track-type vehicle, the rubber track is attached to the vehicle wheel. Accordingly, the ground surface of the portion of the rubber track disposed at the inside of the track-type vehicle situated inward of the imaginary line can be increased in comparison with the ground surface of the portion disposed at the outside. As a result, durability of the portion disposed at the inside can be increased to minimize damage caused to the portion, and a lifespan of the rubber track can be increased.

In addition, the through-groove section is formed at the lug section. Accordingly, even when mud is stuck between the lug sections neighboring in the track circumferential direction upon running of the track-type vehicle, the mud can be easily removed. In addition, a propulsive force of the rubber track can be easily secured. Further, since the through-groove section is formed in the lug section, a sideslip upon running of the track-type vehicle can be controlled by an edge effect due to the edge section defining the opening section of the through-groove section in the lug section.

The through-groove sections may be asymmetrically disposed in the track widthwise direction with respect to the imaginary line.

In this case, the through-groove sections are asymmetrically disposed in the track widthwise direction with respect to the imaginary line. Accordingly, for example, even when the plurality of lug sections are symmetrically disposed in the track widthwise direction with respect to the imaginary line, the areas of the ground surfaces can be easily differentiated from each other at both sides in the track widthwise direction with respect to the imaginary line. As a result, the above-mentioned effect can be reliably accomplished.

Effect of the Invention

According to the rubber track of the present invention, a lifespan of the rubber track can be increased.

EMBODIMENTS FOR CARRYING OUT THE INVENTION

Figure 1:
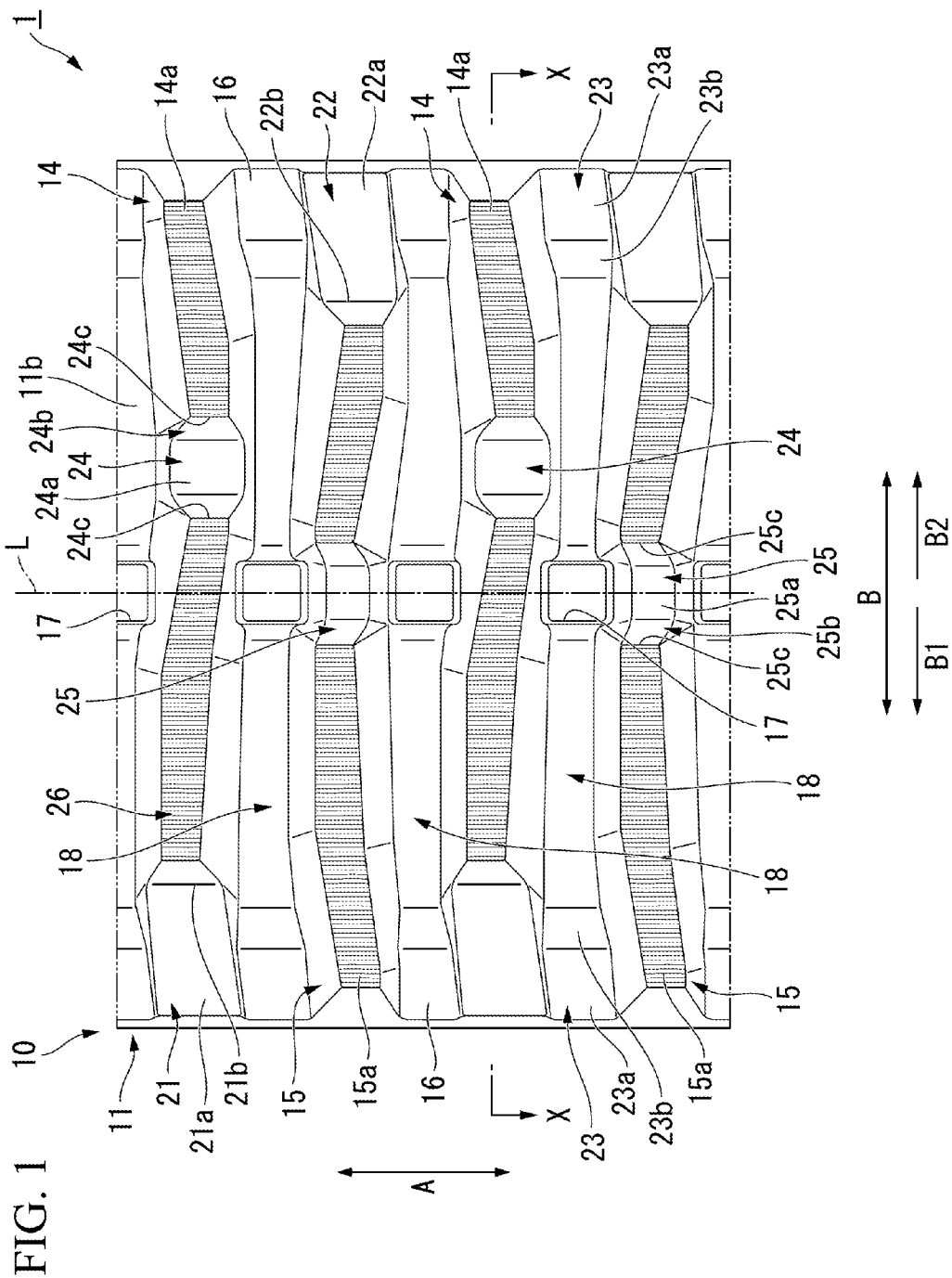
FIG. 1 is a plan view of a rubber track according to an embodiment of the present invention.
Figure 2:
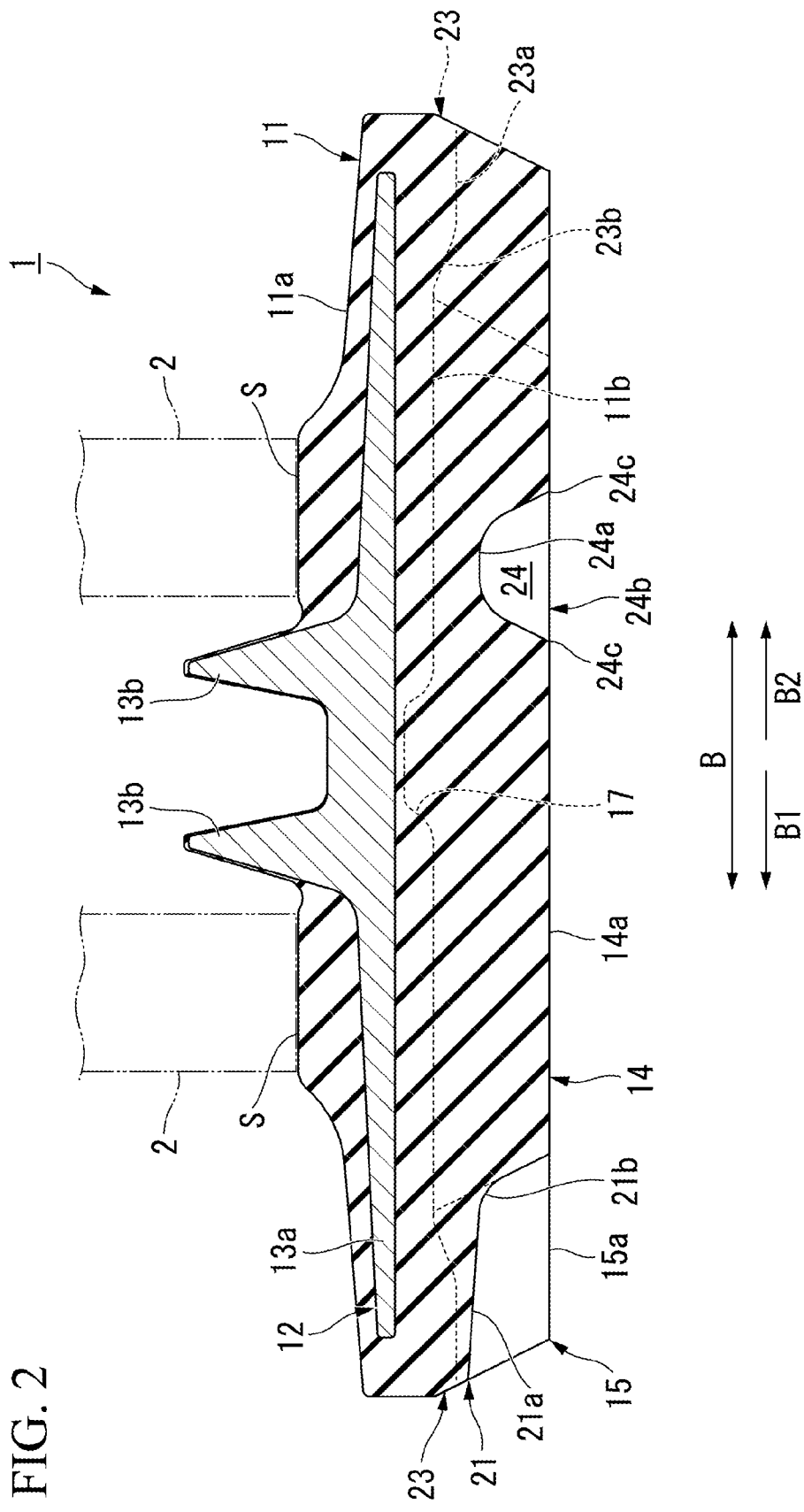
FIG. 2 is a cross-sectional view taken along line X-X shown in FIG. 1.

Hereinafter, a rubber track according to an embodiment of the present invention will be described with reference to the accompanying drawings. As shown in FIGS. 1 and 2, for example, a rubber track 10 wound between a driving wheel (a vehicle wheel of the track-type vehicle) (not shown) having a sprocket shape and a follower wheel in an endless belt shape is installed at each of a pair of left and right track-type running bodies 1 disposed at a lower portion of a construction machine such as a hydraulic excavator or the like, a farm machine, or another track-type vehicle.

The rubber track 10 is formed of a rubber material. In addition, the rubber track 10 includes a track main body 11 wound between the driving wheel and the follower wheel having an endless belt shape, and a plurality of core metals 12 disposed at the track main body 11 in a track circumferential direction A at an interval.

As shown in FIG. 2, the core metal 12 includes a blade section 13a buried in the track main body 11, and a pair of protrusion sections 13b protruding from the blade section 13a toward an inner circumferential 11a of the track main body 11, mutually disposed in a track widthwise direction B at an interval and between which the driving wheel and the follower wheel pass. The blade section 13a extends in the track widthwise direction B. In addition, the pair of protrusion sections 13b are disposed at a central section in the track widthwise direction B of the blade section 13a.

In addition, in the track main body 11, a steel cord layer (not shown) continuously extending in the track circumferential direction A may be buried at a portion positioned closer to an outer circumferential surface 11b of the track main body 11 than the blade section 13a. In this case, for example, a pair of steel cord layers may be buried in portions positioned outside farther from the track main body 11 in the track widthwise direction B than the protrusion section 13b, in the portion closer to the outer circumferential surface 11b.

As shown in FIG. 1, a plurality of lug sections 14 and 15 protrude from the outer circumferential surface 11b of the track main body 11 in the track circumferential direction A at an interval. The lug sections 14 and 15 protrude from the outer circumferential surface 11b of the respective portions, in which the core metal 12 is buried, of the track main body 11.

In the track main body 11, engaging holes (engaging sections) 17 engaged with the driving wheel are disposed in lug interval sections 16 disposed between the lug sections 14 and 15 neighboring in the track circumferential direction A such that positions in the track widthwise direction B are equal to each other. In the embodiment, these engaging holes 17 are disposed at a central section in the track widthwise direction B of the track main body 11.

In addition, these engaging holes 17 are disposed on an imaginary line L which extends in the track circumferential direction A throughout the entire circumference and passes through a center in the track widthwise direction B of the track main body 11.

The imaginary line L passes over all of the engaging holes 17. In addition, the imaginary line L passes through centers in the track widthwise direction B of the engaging holes 17.

In the embodiment, a first lug section 14 and a second lug section 15 deviated to be opposite to each other in the track widthwise direction B with respect to the imaginary line L are provided as the lug sections 14 and 15. The first lug section 14 and the second lug section 15 are alternately disposed in the track circumferential direction A. In addition, all intervals between the first lug sections 14 and the second lug sections 15 neighboring in the track circumferential direction A are equal to each other. Further, hereinafter, a direction of the track widthwise direction B in which the second lug section 15 is deviated with respect to the imaginary line L is referred to as one side B1. In addition, a direction in which the first lug section 14 is deviated with respect to the imaginary line L is referred to as the other side B2.

A width in the track widthwise direction B of the first lug section 14 and the second lug section 15, a length in the track circumferential direction A of both of the lug sections 14 and 15, and a protrusion amount from the track main body 11 of both of the lug sections 14 and 15 are equal to each other. In addition, eccentricity by which the first lug section 14 is deviated to the other side B2 with respect to the imaginary line L and eccentricity by which the second lug section 15 is deviated to the one side B1 are equal to each other.

As described above, in the embodiment, the plurality of lug sections 14 and 15 are disposed in the track circumferential direction A at the same interval. In addition, the plurality of lug sections 14 and 15 are alternately disposed at the one side B1 and the other side B2 to be deviated with respect to the imaginary line L by the same eccentricity. Accordingly, the plurality of lug sections 14 and 15 substantially symmetrically protrude in the track widthwise direction B with respect to the imaginary line L. In addition, as shown in FIG. 2, top surfaces 14a and 15a of the lug sections 14 and 15 extend in the track widthwise direction B.

As shown in FIG. 1, an end edge of the other side B2 of the first lug section 14 coincides with an end edge of the other side B2 of the track main body 11. Further, in the outer circumferential surface 11b of the track main body 11, a first bump section 21 that is raised with respect to the outer circumferential surface 11b is disposed at a portion extending from the one side B1 to the first lug section 14. As shown in FIG. 2, the first bump section 21 has a top surface 21a and a concave surface 21b. The top surface 21a of the first bump section 21 is connected to an end surface of the first lug section 14 directed toward the one side B1 via the concave surface 21b. In addition, a bump amount of the first bump section 21 is gradually reduced from the other side B2 to the one side B1.

As shown in FIG. 1, an end edge of the one side B1 of the second lug section 15 coincides with an end edge of the one side B1 of the track main body 11. Further, in the outer circumferential surface 11b of the track main body 11, a second bump section 22 that is raised with respect to the outer circumferential surface 11b is disposed at a portion extending from the other side B2 to the second lug section 15. The second bump section 22 has a top surface 22a and a concave surface 22b. The top surface 22a of the second bump section 22 is connected to an end surface of the second lug section 15 directed toward the other side B2 via the concave surface 22b. In addition, a bump amount of the second bump section 22 is gradually reduced from the one side B1 to the other side B2.

Interval bump sections 23 that are raised with respect to the outer circumferential surface 11b are disposed at both ends in the track widthwise direction B of the outer circumferential surface 11b of the lug interval section 16 of the track main body 11. A bump amount of the interval bump section 23 is set to be smaller than any one of the bump amounts of the first bump section 21 and the second bump section 22. A width in the track widthwise direction B of the interval bump section 23 is smaller than that of each of the first bump section 21 and the second bump section 22. The interval bump section 23 connects the first lug section 14 and the second bump section 22, or the second lug section 15 and the first bump section 21 in the track circumferential direction A. In addition, as shown in FIG. 2, a top surface 23a of the interval bump section 23 extends in the track widthwise direction B. Further, the top surface 23a of the interval bump section 23 is connected to the outer circumferential surface 11b of the track main body 11 via an inclined surface 23b.

As shown in FIG. 1, through-groove sections 24 and 25 passing through the lug sections 14 and 15 in the track circumferential direction A are formed in the plurality of lug sections 14 and 15, respectively. The plurality of through-groove sections 24 and 25 are asymmetrically disposed in the track widthwise direction B with respect to the imaginary line L. In addition, areas of a ground surface 26 constituted by the top surfaces 14a and 15a of the plurality of lug sections 14 and 15 are different from each other at both sides in the track widthwise direction B with respect to the imaginary line L.

In the embodiment, the through-groove sections 24 and 25 are formed in the lug sections 14 and 15, respectively. In addition, the through-groove sections 24 and 25 include a first through-groove section 24 formed in a portion of the first lug section 14 deviated from the imaginary line L in the track widthwise direction B, and a second through-groove section 25 formed in a portion of the second lug section 15 disposed on the imaginary line L.

The first through-groove section 24 and the second through-groove section 25 are alternately disposed in the track circumferential direction A. Both of the first through-groove section 24 and the second through-groove section 25 extend in the track circumferential direction A. The through-groove sections 24 and 25 are in communication with inter-lug spaces 18 disposed at both sides in the track circumferential direction A of the lug sections 14 and 15, among the inter-lug spaces 18 formed between the lug sections 14 and 15 neighboring in the track circumferential direction A.

Each of the first through-groove sections 24 is formed in a portion of the first lug section 14 deviated from the imaginary line L to the other side B2. Positions in the track widthwise direction B of all of the first through-groove sections 24 are equal to each other. In addition, as shown in FIG. 2, a depth of the first through-groove section 24 is set such that a bottom surface 24a of the first through-groove section 24 does not reach the outer circumferential surface 11b of the track main body 11. The bottom surface 24a of the first through-groove section 24 is constituted by the first lug section 14. Further, a width of the first through-groove section 24 is gradually increased from the bottom surface 24a toward an opening section 24b in the track widthwise direction B.

As shown in FIG. 1, the second through-groove sections 25 are symmetrically disposed in the track widthwise direction B with respect to the imaginary line L. Positions in the track widthwise direction B of all of the second through-groove sections 25 are equal to each other. A depth of the second through-groove section 25 is set such that a bottom surface 25a of the second through-groove section 25 reaches the outer circumferential surface 11b of the track main body 11. In addition, the bottom surface 25a of the second through-groove section 25 is constituted by the track main body 11. As the through-groove sections 24 and 25 are disposed as described above, an area of a portion of the ground surface 26 disposed at the one side B1 from the imaginary line L is larger than an area thereof disposed at the other side B2.

The driving wheel is rotatably supported by a driving unit such as a hydraulic motor or the like installed at the vehicle frame (not shown). The follower wheel is rotatably supported by the vehicle frame. Further, as shown in FIG. 2, a plurality of trunk rollers 2 rotatably supported by the vehicle frame are disposed at a position between the driving wheel and follower wheel at the inner circumferential 11a side of the track main body 11.

The trunk rollers 2 are rolled on the trunk roller surface S formed at the inner circumferential 11a side of the track main body 11 according to forwarding movement of the rubber track 10 in the track circumferential direction A.

In addition, the trunk roller surface S continuously extends throughout the entire circumference of the track circumferential direction A in a portion of the inner circumferential 11a side of the track main body 11 disposed outside the track main body 11 in the track widthwise direction B situated outward of the protrusion section 13b of the core metal 12.

In the track-type running body 1, in a state in which the one side B1 is directed toward the inside of the track-type vehicle, the rubber track 10 is wound between the driving wheel and the follower wheel.

As described above, according to the rubber track 10 of the embodiment, an area of a portion of the ground surface 26 disposed at the one side B1 from the imaginary line L is larger than an area of a portion disposed at the other side B2. Accordingly, as described above, in a state in which the one side B1 is directed toward the inside of the track-type vehicle, the rubber track 10 is attached to the driving wheel. As a result, in the rubber track 10, the ground surface 26 of a portion disposed at a position of the inside of the track-type vehicle from the imaginary line L can be increased in comparison with the ground surface 26 disposed at the outside. In addition, durability of the portion disposed at the inside can be increased to hardly cause damage to the portion, and a lifespan of the rubber track 10 can be increased. Further, a bump amount of the interval bump section 23 is set to be smaller than that of the first bump section 21 and the second bump section 22. Accordingly, the end section of the core metal 12 can be prevented from being cracked. As a result, the lifespan of the rubber track 10 can be increased.

The through-groove sections 24 and 25 are asymmetrically disposed in the track widthwise direction B with respect to the imaginary line L. Accordingly, for example, like the embodiment, even when the plurality of lug sections 14 and 15 are substantially symmetrically disposed in the track widthwise direction B with respect to the imaginary line L, the areas of the ground surfaces 26 can be easily varied at both sides in the track widthwise direction B with respect to the imaginary line L. As a result, the above-mentioned effect can be reliably obtained.

The first bump section 21 and the second bump section 22 have the concave surface 21b and the concave surface 22b, respectively. The bump amount of the first bump section 21 is gradually reduced from the other side B2 to the one side B1. In addition, the bump amount of the second bump section 22 is gradually reduced from the one side B1 to the other side B2. Accordingly, even when mud is stuck to the first bump section 21 and the second bump section 22 upon running of the track-type vehicle, the mud can be easily removed. In particular, as a concave surface is provided, the mud cannot be easily blocked at corners of the bump section. As a result, a propulsive force of the rubber track 10 can be easily secured. In addition, the through-groove sections 24 and 25 are formed at the lug sections 14 and 15. Accordingly, even when mud is stuck between the lug sections 14 and 15 neighboring in the track circumferential direction A upon running of the track-type vehicle, the mud can be easily removed, and thus a propulsive force of the rubber track 10 can be easily secured. In addition, a width in the track widthwise direction B of the first through-groove section 24 is gradually increased from the bottom surface 24a side toward the opening section 24b. Accordingly, even when the mud is stuck to the inside of the first through-groove section 24 upon running of the track-type vehicle, the mud can be easily removed from the first through-groove section 24. As a result, excavation of the rubber track 10 can be further improved, and the propulsive force of the rubber track 10 can be easily secured. Further, the through-groove sections 24 and 25 are formed in the lug sections 14 and 15. Accordingly, a sideslip upon running of the track-type vehicle can be suppressed by an edge effect due to the edge sections 24c and 25c defining the opening sections 24b and 25b of the through-groove sections 24 and 25 of the lug sections 14 and 15.

Figure 3:
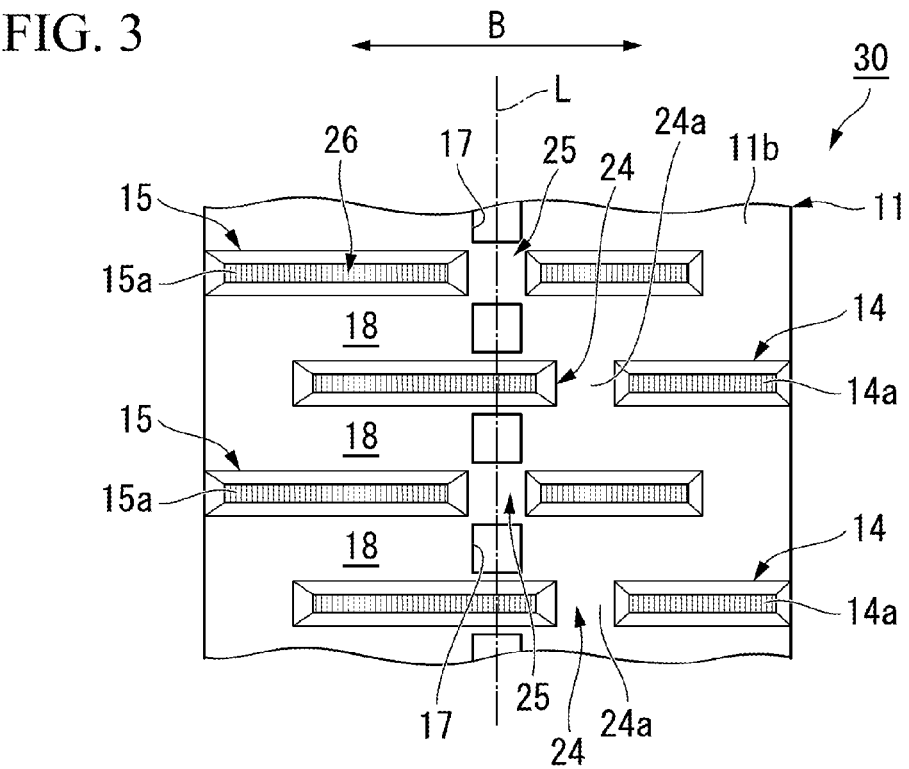
FIG. 3 is a plan view of a variant of the rubber track according to the embodiment of the present invention.

In addition, the technical scope of the present invention is not limited to the embodiment but various modifications may be made without departing from the teaching of the present invention. For example, like a rubber track 30 shown in FIG. 3, the first lug section 14 and the second lug section 15 may have the same shape and the same size. The plurality of lug sections 14 and 15 may be completely symmetrically disposed in the track widthwise direction B with respect to the imaginary line L. In addition, the first lug section 14 and the second lug section 15 may extend in the track widthwise direction B. Further, the first bump section 21, the second bump section 22 and the interval bump section 23 may not be provided. Furthermore, a depth of the first through-groove section 24 may be set such that the bottom surface 24a of the first through-groove section 24 reaches the outer circumferential surface 11b of the track main body 11. In this case, the bottom surface 24a of the first through-groove section 24 is constituted by the track main body 11.

Figure 4:
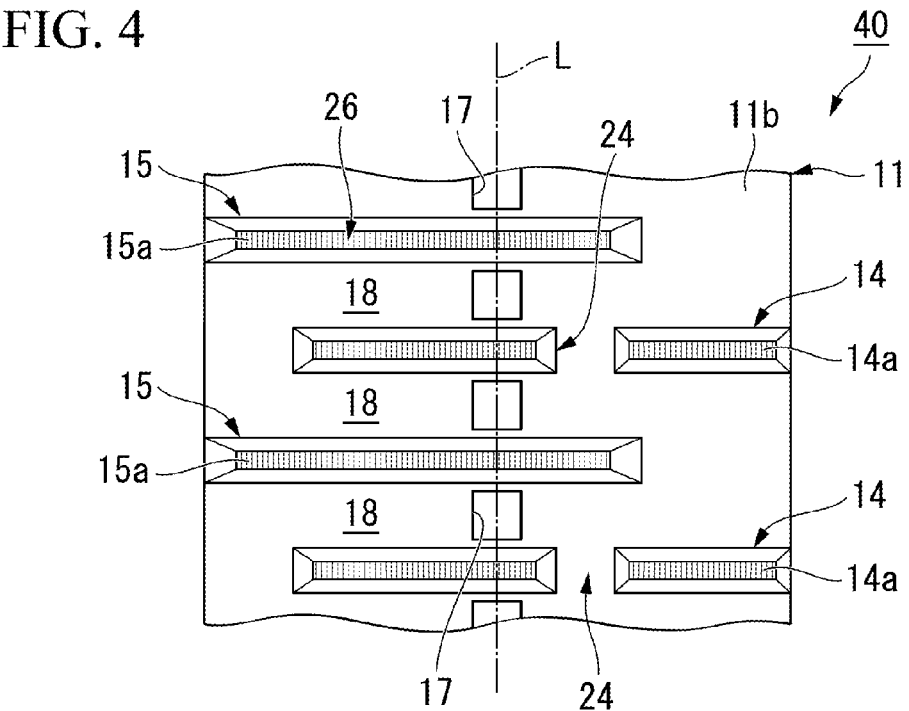
FIG. 4 is a plan view of a variant of the rubber track according to the embodiment of the present invention.

In addition, when the areas of the ground surfaces 26 are different from each other at both sides in the track widthwise direction B with respect to the imaginary line L, the through-groove sections 24 and 25 are not limited to the configuration shown in the embodiment. For example, the through-groove sections 24 and 25 may not be formed in all of the lugs. For example, like a rubber track 40 shown in FIG. 4, the second through-groove section 25 may not be formed in the second lug section 15. In addition, for example, both of the first through-groove section 24 and the second through-groove section 25 may be formed in both of the lug sections 14 and 15. Furthermore, in the embodiment, while the second through-groove sections 25 are symmetrically disposed in the track widthwise direction B with respect to the imaginary line L, it is not limited thereto. For example, instead of this, the second through-groove sections 25 may be disposed on the imaginary line L while being deviated to the other side B2 with respect to the imaginary line L.

In addition, when the areas of the ground surfaces 26 are different from each other at both sides in the track widthwise direction B with respect to the imaginary line L, the plurality of through-groove sections 24 and 25 may be asymmetrically disposed in the track widthwise direction B with respect to the imaginary line L. For example, when the plurality of lug sections 14 and 15 asymmetrically protrude in the track widthwise direction B with respect to the imaginary line L, the plurality of through-groove sections can be symmetrically disposed in the track widthwise direction B with respect to the imaginary line L.

Figure 5:
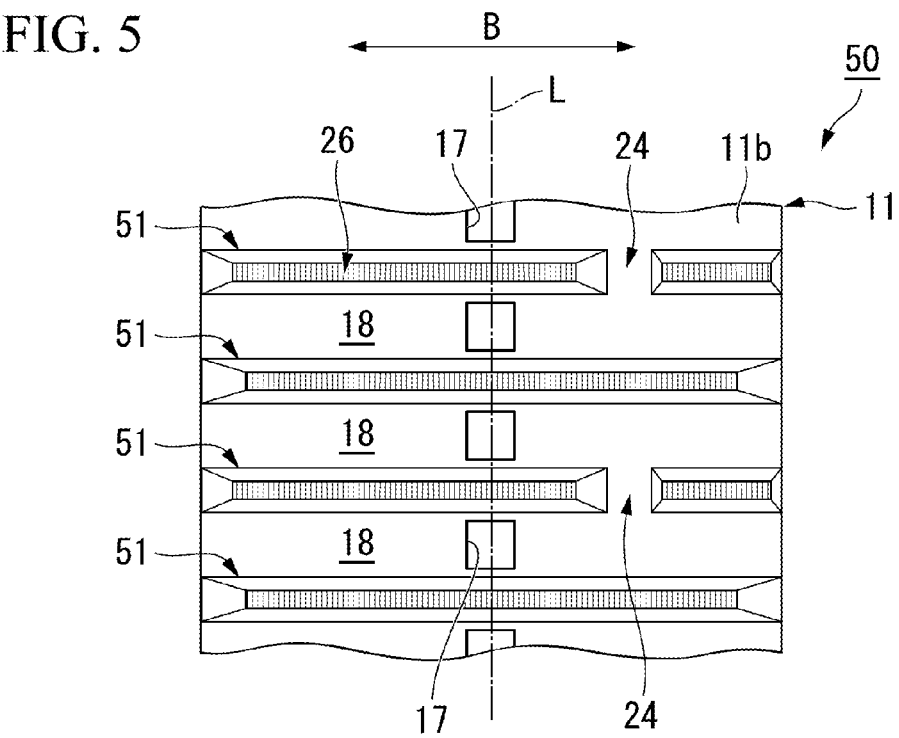
FIG. 5 is a plan view of a variant of the rubber track according to the embodiment of the present invention.
Figure 6:
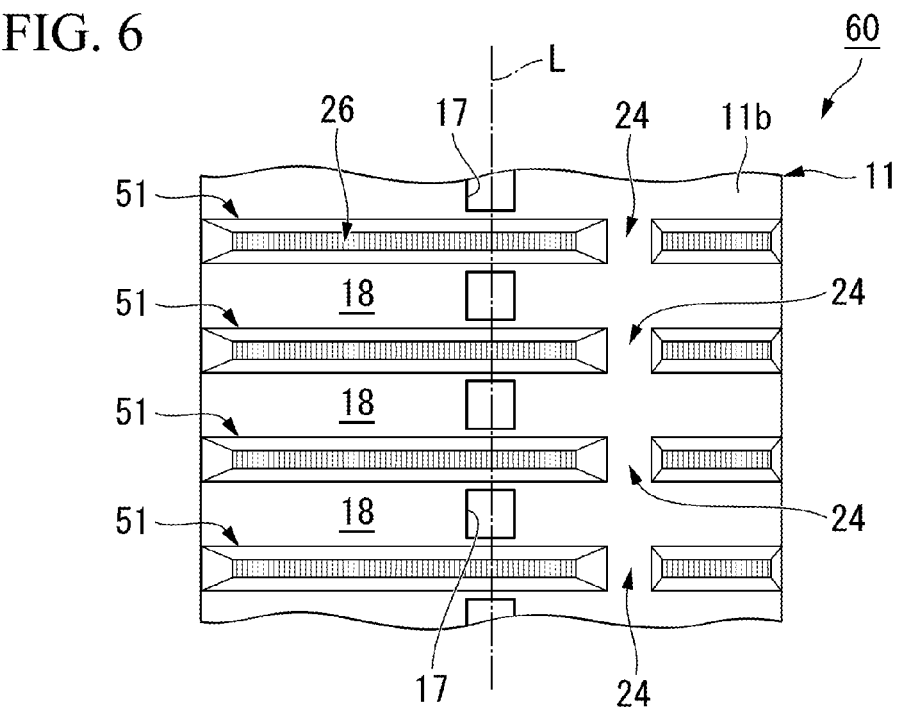
FIG. 6 is a plan view of a variant of the rubber track according to the embodiment of the present invention.

In addition, in the embodiment, while the first lug section 14 and the second lug section 15 deviated in the track widthwise direction B with respect to the imaginary line L are provided as the lug sections 14 and 15, it is not limited thereto. For example, like rubber tracks 50 and 60 shown in FIGS. 5 and 6, third lug sections 51 symmetrically disposed in the track widthwise direction B with respect to the imaginary line L may be provided as the lug section. In this case, for example, like the rubber track 50 shown in FIG. 5, the first through-groove sections 24 may be formed in every other third lug section 51, and for example, like the rubber track 60 shown in FIG. 6, the first through-groove sections 24 may be formed in all of the third lug sections 51. In addition, in an example shown in FIGS. 5 and 6, while the third lug section 51 extends throughout the entire length in the track widthwise direction B of the track main body 11, it is not limited thereto but the third lug section 51 may not extend throughout the entire length.

In addition, in the embodiment, while the top surfaces 14a and 15a of the lug sections 14 and 15 extend in the track widthwise direction B, it is not limited thereto. For example, the top surfaces 14a and 15a of the lug sections 14 and 15 may be inclined with respect to the track widthwise direction B. Further, in the embodiment, while the imaginary line L passes through a center in the track widthwise direction B of the track main body 11, it is not limited thereto. For example, the imaginary line L may be deviated from the center in the track widthwise direction B.

In addition, in the embodiment, while the driving wheel has a sprocket shape and the engaging hole 17 is formed in the lug interval section 16 of the track main body 11 as the engaging section engaged with the driving wheel, it is not limited thereto. For example, when engaging concave sections are intermittently formed in the driving wheel in the circumferential direction, engaging protrusion sections may protrude from the inner circumferential 11a side of the lug interval section 16 as the engaging section.

Moreover, the components of the embodiment can be appropriately replaced with well-known components and the modifications may be appropriately combined without departing from the teaching of the present invention.

INDUSTRIAL APPLICABILITY

According to the rubber track provided in the present invention, the lifespan of the rubber track can be increased.

BRIEF DESCRIPTION OF THE REFERENCE SYMBOLS 10, 30, 40, 50, 60 rubber track
11 main body
11b outer circumferential surface
12 core metal
13a blade section
13b protrusion section
14, 15, 51 lug section
14a, 15a top surface
17 engaging hole (engaging section)
24, 25 through-groove section
26 ground surface
A track circumferential direction
B track widthwise direction
L imaginary line

The invention claimed is:
1. A rubber track comprising:
a track main body formed of a rubber material in an endless belt shape,
in which a plurality of lug sections protrude from an outer circumferential surface of the track main body in a track circumferential direction at an interval,
engaging sections engaged with a vehicle wheel of a track-type vehicle are disposed at a portion of the track main body disposed between the lug sections neighboring in the track circumferential direction, and
a through-groove section passing through the lug section in the track circumferential direction is formed in the lug section,
wherein total areas of ground surfaces formed by top surfaces of the plurality of lug sections are different from each other at both sides in a track widthwise direction with respect to an imaginary line which passes through the through-groove section and extends in the track circumferential direction throughout the entire circumference and pass over the plurality of engaging sections.

2. The rubber track according to claim 1, wherein the through-groove sections are asymmetrically disposed in the track widthwise direction with respect to the imaginary line.

3. The rubber track according to claim 1, wherein the through-groove sections formed at the lug sections neighboring in the track circumferential direction are deviated from the center in the track widthwise direction and one of the through-groove sections is disposed on an imaginary line.

4. The rubber track according to claim 1, wherein the engaging sections are disposed at a central section in the track widthwise direction of the track main body.

* * * * *